United States Patent [19]

Mills

[11] Patent Number: 4,614,356
[45] Date of Patent: Sep. 30, 1986

[54] APPARATUS FOR ALIGNING HITCHES OF TOWING AND TOWED VEHICLES

[76] Inventor: Roy Mills, 1128 Karla Dr., Hurst, Tex. 76053

[21] Appl. No.: 779,230

[22] Filed: Sep. 23, 1985

[51] Int. Cl.⁴ .............................................. B60Q 1/00
[52] U.S. Cl. ...................................... 280/477; 340/686
[58] Field of Search ................. 280/477; 340/686, 687; 33/264; 116/28 R

[56] References Cited

U.S. PATENT DOCUMENTS

| | | | |
|---|---|---|---|
| 2,927,310 | 3/1960 | Knapp | 340/686 |
| 3,159,917 | 12/1964 | Whitehead | 280/477 |
| 3,774,149 | 11/1973 | Bennett | 280/477 |
| 3,858,966 | 1/1975 | Lowell | 280/477 |
| 3,901,536 | 8/1975 | Black | 340/687 |
| 3,938,122 | 2/1976 | Mangus | 280/477 |
| 4,065,147 | 12/1977 | Ross | 280/477 |
| 4,199,756 | 4/1980 | Dito | 340/686 |

*Primary Examiner*—John J. Love
*Assistant Examiner*—Mark C. Dukes
*Attorney, Agent, or Firm*—James E. Bradley

[57] ABSTRACT

An aligning device for aligning hitches of towing and towed vehicles that facilitates trailer hookup. The device includes a bracket which releasably attaches to the towing vehicle. A rod is slidably mounted to the bracket. The rod points rearwardly for contacting the target located on the towed vehicle. When the rod contacts the target and the vehicle moves rearwardly a short distance, a switch will signal alignment of the hitches.

7 Claims, 5 Drawing Figures

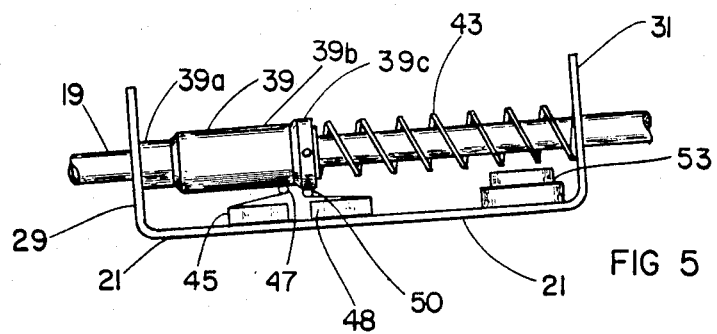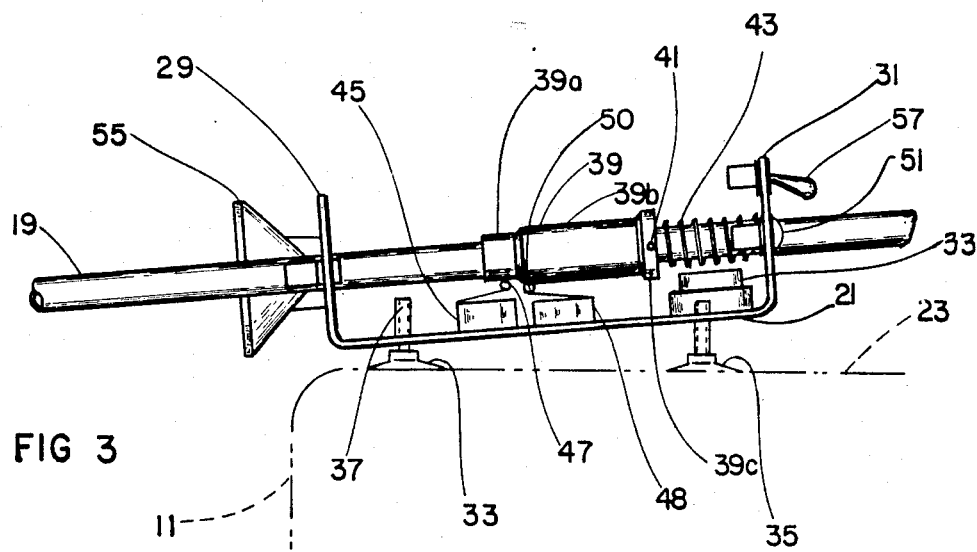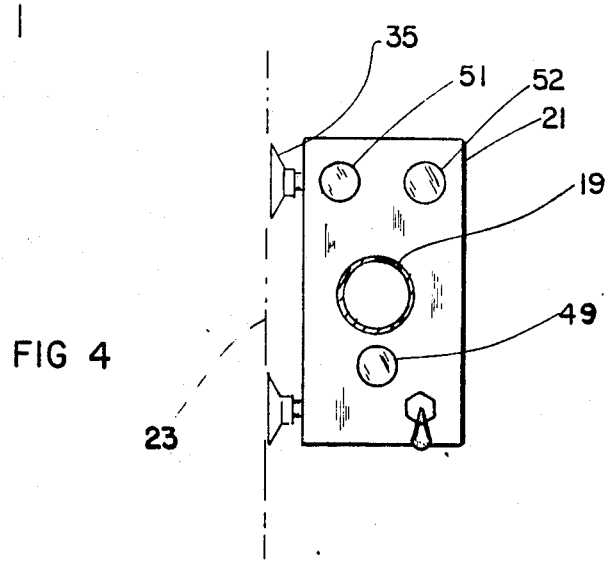

APPARATUS FOR ALIGNING HITCHES OF TOWING AND TOWED VEHICLES

BACKGROUND OF THE INVENTION

1. Field of the Invention

This invention relates in general to automotive accessories, and in particular to an apparatus for assisting a driver in aligning the ball hitch of a towing vehicle with the socket hitch of the towed vehicle.

2. Description of the Prior Art

Large numbers of recreation vehicles are towed about the country on a regular basis. These recreation vehicles include boats on trailers, trailers or campers with living facilities, and collapsible tents on wheels. Each will have a tongue and a hitch for coupling to a mating hitch on the towing vehicle, which is usually an automobile or a pickup.

Hitching the vehicles together can be difficult. In many cases, the towed vehicle's tongue weight is too heavy for a person to easily move the trailer about. This requires precise alignment of the ball hitch with the trailer socket. Normally this is handled by someone giving the driver directions as he backs the towing vehicle toward the trailer. Sometimes a person is not available for giving directions. Also, providing the directions is not easy.

Proposals have been made in the patented art to provide devices to assist in aligning the vehicle. For example, note U.S. Pat. Nos. 4,199,756, Dito, Apr. 22, 1980; 3,901,536, Black, Aug. 26, 1975 and 3,159,917, Whitehead, Dec. 8, 1964. To the inventor's knowledge, there are no devices such as shown in these patents, or any other aligning devices, available on the market today. A need exists for a simple, inexpensive and effective device to assist in aligning hitches of a towed vehicle.

SUMMARY OF THE INVENTION

A device of this invention includes a bracket which is releasably attached to the side of the towing vehicle near the rear. A rod is slidably carried by the bracket. The rod points rearwardly for contacting a target which is placed on the towed vehicle. The rod can be positioned so that when it is in contact with the target, and the towing vehicle and bracket have moved rearwardly a predetermined distance, alignment of the hitches will occur. A switch detects this predetermined distance, and signals the driver of the occurence.

BRIEF DESCRIPTION OF THE DRAWINGS

FIG. 3 is an enlarged, top view of the apparatus of the invention, shown with the cover removed, and with the rod in a retracted position.

FIG. 4 is a view of the front side of the apparatus as shown in FIG. 3.

FIG. 5 is a top view of part of the apparatus as shown in FIG. 4, but with the rod in an extended position.

DESCRIPTION OF THE PREFERRED EMBODIMENT

Figure 1:
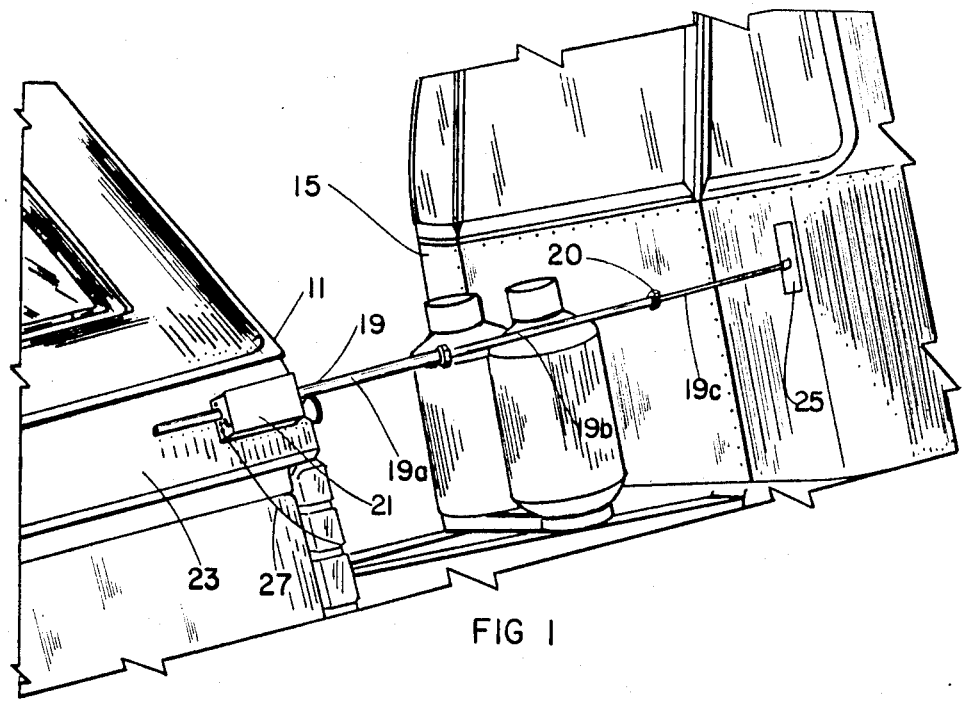
FIG. 1 is a partial perspective view illustrating an apparatus constructed in accordance with this invention.
Figure 2:
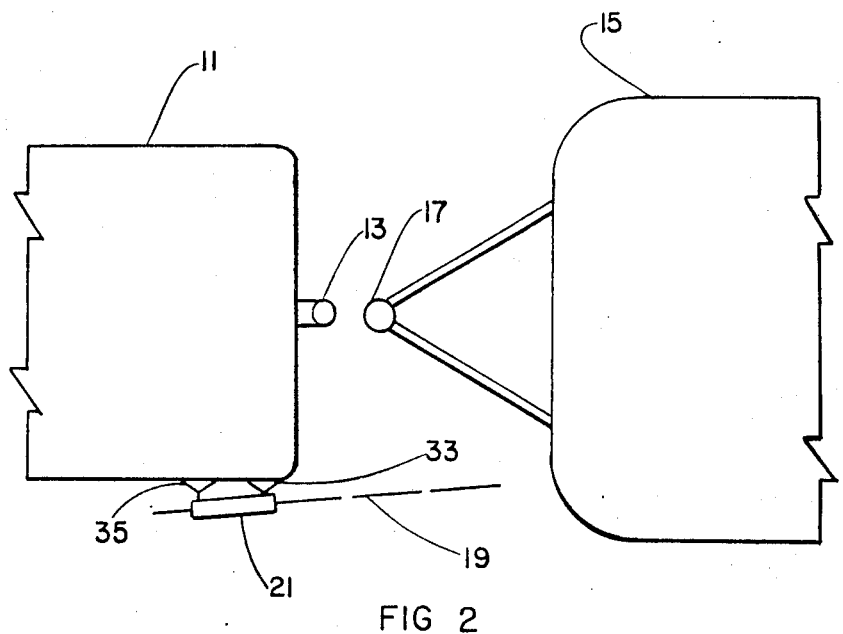
FIG. 2 is a top schematic view showing the apparatus of this invention.

Referring to FIG. 1, a typical towing vehicle 11 is shown. Towing vehicle 11 will have a ball hitch 13 as shown schematically in FIG. 2. The towed vehicle 15 shown is a recreational vehicle or camper with living facilities. Towing vehicle 15 includes a socket 17 on its forward end which is lowered onto the ball 13 to connect the vehicles 11 and 15.

A rod 19 is used to align the hitches 13 and 17. Rod 19 is preferably a telescoping rod having telescoping sections, such as the three sections 19a, 19b and 19c as shown. The telescoping sections 19a, 19b and 19c have conventional couplings 20 at their joints that rigidly clamp the sections 19a, 19b and 19c together, similar to the legs of a camera tripod. In normal operations, the sections 19a, 19b and 19c will be extended to a predetermined length and rigidly clamped in position. When in storage, the couplings 20 are loosened, and the sections 19a, 19b and 19c are collapsed for convenient storage. The length of rod 19 is variable by tightening the couplings 20 at different degrees of extension.

Rod 19 is slidably carried by a cartridge 21. Cartridge 21 is releasably secured to the driver's side 23 of the vehicle near the rear end. Markings would normally be placed on the vehicle side 23 so that the cartridge 21 is always placed in the same position when used. A target 25, preferably of an antiskid type material, is placed permanently on the vehicle 15. Cartridge 21 is positioned so that when alignment of hitches 13 and 17 occurs, rod 19 will be contacting the target 25. An electrical wire 27 connected to cartridge 21 is adapted to be connected to the vehicle 11 trailer light connection (not shown) for supplying power. Optionally, an internal battery is located in cartridge 21.

Referring to FIG. 3, the cartridge 21 includes a bracket 22 with two bearing members 29, 31 which are spaced apart plates integrally formed with the bracket 22. The rod 19 extends slidably through holes provided in the bearing members 29, 31. The attaching means for attaching the cartridge 21 to the vehicle 11 preferably comprises rubber suction means. In the embodiment shown, there are four suction cups (only two shown), with two suction cups 33 located on the rearward end of cartridge 21 and two suction cups 35 located on the forward end of cartridge 21.

The apparatus has an orienting means for orienting the rod 19 at various angles with respect to the longitudinal axis of the vehicle 11. Note in FIG. 2, that the rod 19 is pointing rearwardly and inwardly toward the longitudinal axis (not shown) of the vehicle 11. The orienting means allows the target 25 to be placed more toward the center of the towed vehicle 15. This is particularly an advantage when the towed vehicle 15 is of a type that has rounded corners on the front, as shown. If the target 25 is placed on the rounded corner, it might be at too much of an angle to properly serve as a target. The tip of the rod 19 might slide when contacting the target 25. In the preferred embodiment, the orienting means comprises threaded screws 36 which connect the suction cups 33 and 35 to the bracket 22. The forward suction cups 33 have their screws 37 rotated to a much greater depth than the screws of the rearward suction cups 35. This results in the cartridge 21 and the rod 19 being at an inwardly directed angle toward the longitudinal axis of the vehicle. The rearward end of the rod 19 will thus be located closer to the center of the towed vehicle 15 than otherwise. A collar 39 is located on rod 19. Collar 39 has a reduced diameter rearward end 39a, a central portion 39b of a larger diameter, and a forward end or shoulder 39c of still larger diameter. Collar 39 receives the rod 19 closely and can be secured to it at any point by means of a set screw 41. A coil spring 43 contacts the forward bearing member 31 and acts against the collar 39 to push the rod 19 rearwardly. In FIG. 3, the collar 39 is shown pushed into a rearward position, which would occur when the rod 19 has contacted the target 25 and the vehicle 11 has continued to move rearward. In the normal position shown in FIG. 5, prior to contact of rod 19 with vehicle 15, the rearward end 39a of collar 39 will be in contact with the rearward member 29.

A signal means is used to determine when the rod 19 has contacted target 25 and the vehicle 11 and cartridge 21 have moved rearwardly a predetermined distance. The signal means includes a switch 45 which has a contact member or roller 47 that extends outwardly for engaging the collar 39. In the normal condition shown in FIG. 5, the roller 47 will be in contact with the central portion 39b near the forward end 39c. When the rod 19 has contacted target 25 (FIG. 1) and the vehicle has moved rearward for a distance equal to the length of the central section 39b, then roller 47 will roll onto the smaller diameter rearward section 39a. Rearward section 39a is separated from the central section 39b by a stepped surface. The difference in diameter causes the roller 47 to move radially toward the rod 19.

The switch means also includes a similar switch 48 having a spring biased roller 50. Switch 48 is mounted to the bracket 22 of cartridge 21 so that in the normal condition showed in FIG. 5, roller 50 will be in contact with the collar forward end 39c. Once rod 19 contacts target 25 (FIG. 1) and the vehicle continues rearward movement, roller 50 will roll off the rearward section 39c onto central section 39b, which is smaller in diameter.

As shown in FIG. 4, the switches 45 and 48 are connected to an amber caution light 49, a red stop light 51, and a green light 52. The lights 49, 51 and 52 are located on bearing member 31 facing forwardly. They could be positioned in a row. Once power is supplied to the cartridge 21, either through wire 27 (FIG. 1) or internal batteries (not shown), green light 52, and a buzzer 53 will come on. When rod 19 touches the target 25 while vehicle 11 is backing, roller 50 will move quickly off of forward end 39c. Switch 48 will turn off green light 52 and turn on caution light 49. Buzzer 53 continues to sound. The switch 45 will turn the stop light 51 on and turn off the buzzer 53 and caution light 49 when the roller 47 reaches the rearward portion 39a, and moves radially inward. Conventional wiring to the switches 45 and 48, lights 49, stand 52, and buzzer 53 accomplishes this sequence.

The apparatus also includes a spot light 55 which is mounted to the rearward bearing member 29 facing the target 25 to assist the driver under poor light conditions. Spot light 55 is controlled by a switch 57.

In operation, for the first time of use, the driver will position the cartridge 21 at a particular point on the vehicle 11 and mark that point. For example, the cartridge 21 could be aligned with the rear edge of the vehicle 11. Either by measuring, or actually connecting the trailer, the driver should place a target 25 on the towed vehicle 15. The target 25 could be a taped or painted area. If that area is a sloping corner, it should be located toward the center as much as possible. With the hitches 13 and 17 aligned, the rod 19 should be extended into contact with target 25 and spring 43 compressed until stop light 51 comes on. The couplings 20 should be tightened and markings made on the sections 19a, 19b and 19c at this point. This sets the desired length for rod 19. If necessary, the socket screws 36 should be adjusted to achieve the proper orientation of the rod 19 with respect to the longitudinal axis of the vehicle 11.

During use, when the driver needs to connect the towed vehicle 15, he attaches the cartridge 21 at the proper spot and extends the rod sections 19a, 19b and 19c, tightening them in their predetermined positions. He connects the wire 27 to the trailer plug (not shown) on the vehicle 11, or turns on power from internal batteries in cartridge 21. Once power is supplied, the green light 52 will turn on and the buzzer 53 will begin buzzing. The driver backs up, looking out the rearview mirror or out his window or door to align the rod 19 with the target 25. When the rod 19 contacts the target 25, the ball 13 should be about two inches from alignment with the hitch 17. The contact causes the roller 50 to roll off forward end 39c and switch 48 to turn off the green light 52 and turn on the amber light 49. This lets the driver know that he is within two inches of alignment. The buzzer 53 will still be operating. At the end of the two inches of movement, the roller 47 of switch 45 will roll onto the rearward section 39a. Switch 45 will cause the buzzer 53 to stop, the caution light 49 to turn off, and the stop light 51 to come on. The ball 13 should be directly under the socket 17 at this point. The driver then proceeds to connect the hitches 13 and 17. He disengages the power line 27 and removes the cartridge 21 and rod 19 from the exterior of vehicle 11.

The invention has significant advantages. The guiding apparatus is easily connected to the towing vehicle, and easily detached. No modification, other than placing a target, is required on the towed vehicle.

While the invention has been shown in only one of its forms, it should be apparent to those skilled in the art that it is not so limited but is susceptible to various changes without departing from the scope of the invention.

I claim:

1. An apparatus for aligning hitches of towing and towed vehicles, comprising in combination:
   a bracket;
   attaching means for releasably attaching the bracket to a towing vehicle;
   a rod;
   mounting means for slidably mounting the rod to the bracket with the rod protruding rearwardly for contact with a target located on the towed vehicle;
   positioning means for positioning the rod so that when the rod is in contact with the target, and the towing vehicle and bracket have moved rearwardly relative to the rod a predetermined amount, alignment of the hitches occurs; and
   signal means carried by the bracket for detecting when the predetermined amount of relative movement between the rod and bracket has occurred, and for signaling the driver of this occurrence; the positioning means comprising:
   a plurality of telescoping sections in the rod for varying the length of the rod.

2. An apparatus for aligning hitches of towing and towed vehicles, comprising in combination:
   a bracket;
   attaching means for releasably attaching the bracket to a towing vehicle;
   a rod;

mounting means for slidably mounting the rod to the bracket with the rod protruding rearwardly for contact with a target located on the towed vehicle;

positioning means for positioning the rod so that when the rod is in contact with the target, and the towing vehicle and bracket have moved rearwardly relative to the rod a predetermined amount, alignment of the hitches occurs; and signal means carried by the bracket for detecting when the predetermined amount of relative movement between the rod and bracket has occurred, and for signaling the driver of this occurrence; the signal means comprising:

a collar located between the bearing members and secured to the rod;

spring means located between the collar and the bracket for urging the rod rearwardly; and electrical contact means for engaging the collar to determine relative movement between the rod and the bracket.

3. An apparatus for aligning hitches of towing and towed vehicles, comprising in combination:

a bracket;

attaching means for releasably attaching the bracket to a towing vehicle;

a rod;

mounting means for slidably mounting the rod to the bracket with the rod protruding rearwardly for contact with a target located on the towed vehicle;

positioning means for positioning the rod so that when the rod is in contact with the target and the towing vehicle and bracket have moved rearwardly relative to the rod a predetermined amount, alignment of the hitches occurs; and signaling means carried by the bracket for detecting when the predetermined amount of relative movement between the rod and bracket has occurred, and for signaling the driver of this occurrence; and orienting means for selectively varying the direction in which the rod points relative to the vehicle; the attaching means comprising:

at least two suction cups carried by the bracket for attaching to the vehicle, one of the cups being located forward of the other cup, and wherein the orienting means comprises:

a threaded screw interconnecting each cup with the bracket at various distances to change the inclination of the bracket with the vehicle by selectively tightening and loosening the screws.

4. An apparatus for aligning hitches of towing and towed vehicles, comprising in combination:

a target located on the towed vehicle;

a bracket having a pair of spaced-apart bearing members;

attaching means for releasably attaching the bracket to the towing vehicle;

a rod extending slidably through the bearing members and pointing rearwardly fro contacting the target;

a collar secured to the rod between the bearing members;

spring means mounted to the rod for urging the rod rearwardly; and signalling means for detecting when the rod is in contact with the target and the vehicle and bracket have moved rearwardly a predetermined distance, the signalling means comprising switch means with a contact member mounted to the bracket for engaging the collar.

5. The apparatus according to claim 4 wherein the contact member comprises a roller which rolls on the collar, and wherein the collar has a stepped surface at a selected point for moving the roller radially to cause the switch means to actuate the signalling means.

6. The apparatus according to claim 4 wherein the collar and the spring means are located between the bearing members.

7. The apparatus according to claim 4 wherein the switch means also comprises another contact member mounted to the bracket for engaging the collar, one of the contact members actuating a warning means to notify the driver when initial relative movement between the rod and bracket occurs, the other of the contact members actuating the signalling means to notify the driver when the vehicle and bracket have moved rearwardly a predetermined distance relative to the rod.

* * * * *